United States Patent [19]

Inaba et al.

[11] Patent Number: 4,538,639

[45] Date of Patent: Sep. 3, 1985

[54] ROBOT WRIST OF AN INDUSTRIAL ROBOT

[75] Inventors: Hajimu Inaba, Hino; Shigemi Inagaki, Musashino; Susumu Ito, Hino, all of Japan

[73] Assignee: Fujitsu Fanuc Limited, Tokyo, Japan

[21] Appl. No.: 391,447

[22] Filed: Jun. 23, 1982

[30] Foreign Application Priority Data

Jun. 30, 1981 [JP] Japan .................................. 56-100502

[51] Int. Cl.³ .............................................. F16L 27/00
[52] U.S. Cl. .................................. 137/580; 251/149.6;
414/4; 414/736; 901/30
[58] Field of Search ........................ 901/22, 23, 29, 24,
901/26, 30, 38, 40, 41; 414/4, 736, 735, 737;
137/580; 251/149.6

[56] References Cited

U.S. PATENT DOCUMENTS

| 3,229,656 | 1/1966 | Bodey | 901/22 |
| 3,908,695 | 9/1975 | Dunbar | 137/580 |
| 4,114,853 | 9/1978 | Medvick | 251/149.6 |
| 4,151,918 | 5/1979 | Nalcone | 414/736 |
| 4,169,404 | 10/1979 | Tsuchihashi | 901/22 |
| 4,364,707 | 12/1982 | Ott | 901/23 |
| 4,365,928 | 12/1982 | Baily | 901/29 |
| 4,372,721 | 2/1983 | Harjar et al. | |

FOREIGN PATENT DOCUMENTS 1256798 12/1971 United Kingdom ................. 901/22

Primary Examiner—A. Michael Chambers
Attorney, Agent, or Firm—Armstrong, Nikaido, Marmelstein & Kubovcik

[57] ABSTRACT

A robot wrist of an industrial robot having a wrist housing supporting two orthogonally arranged rotating output shafts therein, each of the shafts being connected to a robot hand, and a built-in fluid conveying means provided for distributing pressurized air introduced from the outside of the robot wrist toward the robot hand attached to one of the rotating output shafts. An output end of each of the two rotating output shafts may either be plugged by a plug element or closed by a stop valve when the output end is not connected to the robot hand.

7 Claims, 5 Drawing Figures

ROBOT WRIST OF AN INDUSTRIAL ROBOT

DESCRIPTION OF THE INVENTION

The present invention relates to an industrial robot operating as an industrial manipulating mechanism, more particularly to a robot wrist of an industrial robot having a fluid conveying means therein for conveying air under pressure to a robot hand detachably attached to the robot wrist.

Industrial robots have been widely used with machine tools for promoting automatic operation. The machine tools employ the robots as industrial manipulating devices for the transfer or attachment and detachment of workpieces.

FIG. 1 illustrates a typical example of the general construction of such an industrial robot. In FIG. 1, an industrial robot has a robot body 14 rotated with a robot rotary table 12 turning about a vertical axis of a robot base 10. The robot body 14 is also adapted to be vertically movable along guide pillars 18 by a ball screw 16 engaged with a ball nut (not illustrated in FIG. 1). A robot arm 20 supported by the robot body 14 is adapted to be extended and contracted in a horizontal direction with respect to the robot body 14. A robot hand 24 is detachably attached to an outer end of the robot arm 20 through a robot wrist 22. Thus, the robot hand 24 attached to the robot wrist 22 is capable of moving within a three-dimensional space from one position to another through the combination of the rotary motion and the vertical motion of the robot body 14 and the extending and contracting motions of the robot arm 20.

In the industrial robot illustrated in FIG. 1, a pressurized fluid, such as pressurized air, is used for operating and controlling the manipulative motions of the robot hand 24, for example, a workpiece gripping motion and a workpiece releasing motion. Therefore, it is necessary that the robot hand 24 be supplied with pressurized air from a pressurized air source by means of an appropriate piping arrangement. Accordingly, in the robot of FIG. 1, the pressurized air is introduced into an air passageway provided inside the robot arm 20 from an outside pressurized air source via the robot base 10 and/or the robot body 14. Furthermore, the pressurized air is supplied directly from the robot arm 20 to the robot hand 24 by the employment of flexible conduits arranged outside of the robot arm 20 and the robot hand 24.

This conventional fluid conveying system, including such flexible conduits arranged outside of the robot hand 24, however, is liable to hinder the rotating motion of the robot hand 24 or interfere with machines or equipment located around the industrial robot during manipulative operations.

Moreover, some recent industrial robots are equipped with a robot wrist having two different end faces for selective attachment of the robot hand 24 in accordance with a desired robot manipulative operation. In such a robot type, the flexible conduits for supply of the pressurized air cause trouble for operators when changing the position of the robot hand 24.

An object of the present invention is, therefore, to provide a robot wrist of an industrial robot, having a fluid conveying means therein for supplying pressurized air to the robot hand attached to the robot wrist, thereby eliminating the flexible conduit arrangement between the robot arm and the robot hand.

Another object of the present invention is to provide a robot wrist of an industrial robot capable of automatic supply of pressurized air to a robot hand when the robot hand is attached to the end face of the robot wrist.

In accordance with the present invention, there is provided a robot wrist attached to an end of a robot arm of an industrial robot for attaching thereto a manipulative robot hand, comprising:

a wrist housing means for supporting therein two rotating output shafts, each having the output end thereof disposed in one of two substantially orthogonally arranged end faces of said housing means;

a rotation drive means for rotating said two rotating output shafts;

a fluid conduit means provided in said two rotating output shafts for distributing pressurized fluid to said output ends while said pressurized fluid is introduced into said wrist housing means;

a means for conveying said pressurized fluid from outside said wrist housing means toward said fluid conduit means; and a coupling means for providing a tight connection between said conveying means and said fluid conduit means. Preferably, the robot wrist further comprises two stop valves, each being arranged in the output end of each said rotating output shaft, each said stop valve being openable when said robot hand is attached to each said output end.

The present invention will be readily understood from the ensuing description of the embodiments of the present invention with reference to the accompanying drawings, wherein.

Figure 2:
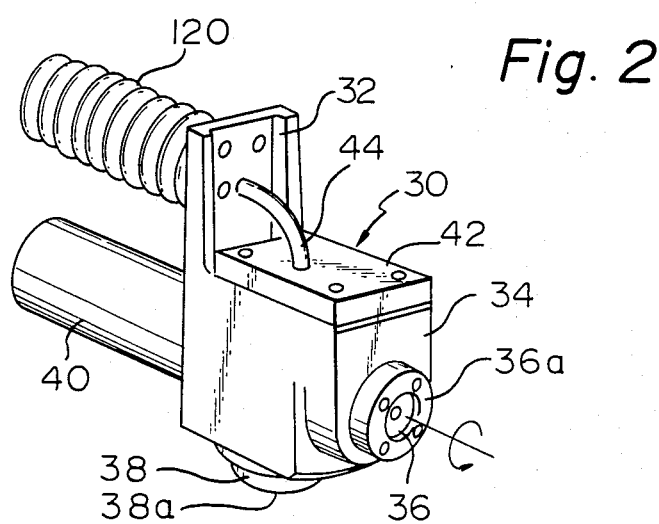
FIG. 2 is a perspective view of a robot wrist of an industrial robot, according to the present invention, illustrating the external construction of the robot wrist.

Referring to FIG. 2, a robot wrist 30 of the present invention has a flange plate 32 for fixedly attaching the robot wrist to a robot arm 120 of an industrial robot by means of suitable fixing means such as screw bolts. The robot wrist 30 includes a first rotary output shaft 36 having an end face 36a for attaching a robot hand and a second rotary output shaft 38 having an end face 38a also attaching a robot hand. The end faces 36a and 38a are substantially orthogonal and positioned on two orthogonal end faces of a wrist housing 34 of the robot wrist 30. Both the first and the second rotary output shafts 36 and 38 are rotated by means of a single rotation drive means, such as an electric servomotor 40, through a reduction gear and bevel gear mechanism, which will be described later. Air under pressure is introduced into the wrist housing 34 of the robot wrist 30 from the robot arm 120 by means of an air supply pipe 44 made of, for example, a metal or plastic pipe. The air supply pipe 44 is brought into the wrist housing 34 through a covering plate 42.

Figure 3:
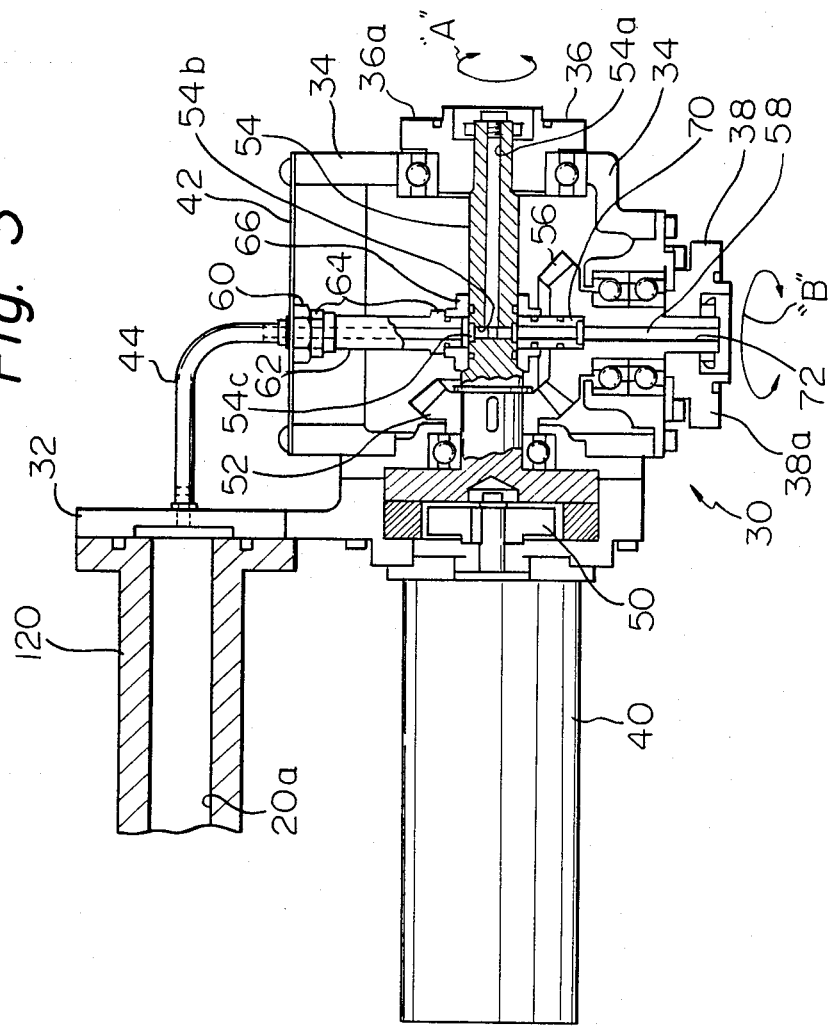
FIG. 3 is a cross-sectional view of the robot wrist of FIG. 2, illustrating the internal arrangement of a fluid conveying means of the robot wrist.

Referring to FIG. 3 illustrating the internal construction of the robot wrist 30 of FIG. 2, identical reference numerals designate identical parts. In FIG. 3, the rotation drive power of the motor 40 is transmitted to a first bevel gear 52 through a reduction gear 50. The first bevel gear 52 has a shaft 54 directly coupled with a first rotary output shaft 36 of the robot wrist 30 for driving the first rotary output shaft 36 in the directions shown by double-headed arrow A. The first bevel gear 52 is engaged with a second bevel gear 56 having a shaft 58 directly coupled with the second rotary output shaft 38 of the robot wrist 30. Accordingly, the second rotary output shaft 38 of the robot wrist 30 is rotated in both directions of double-headed arrow B.

Figure 1:
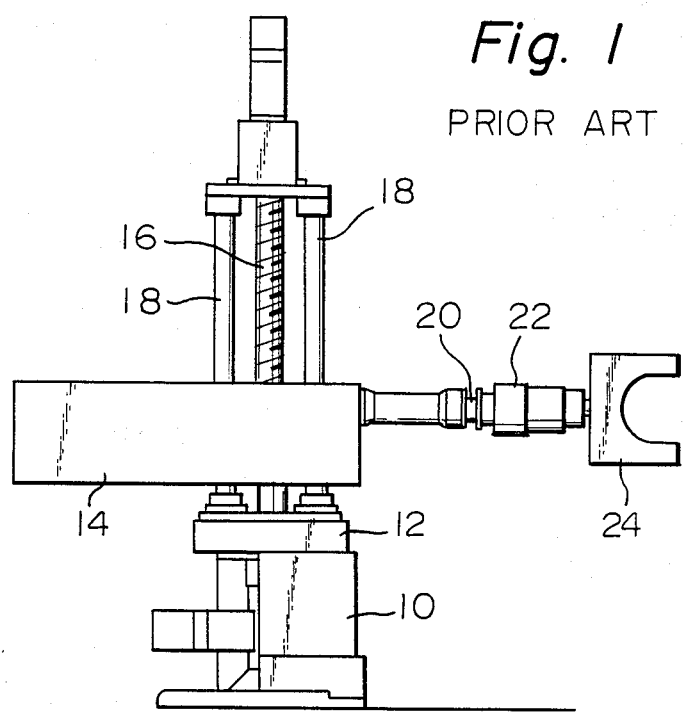
FIG. 1 is a front view of an industrial robot illustrating a general structure and arrangement of the robot provided with a conventional robot wrist.

It will be understood from the foregoing description of the structure and arrangement of the robot wrist 30 that the provision of the two rotary output shafts 36 and 38 for the robot wrist 30 enables attachment of a robot hand of the type illustrated in FIG. 1 to either the end face 36a of the shaft 36 or the end face 38a of the shaft 38.

The fluid conveying means built in the robot wrist 30 for supplying pressurized air to the robot hand will now be described. The pressurized air supplied from an air passageway 20a formed in the robot arm 120 is introduced into the housing 34 of the robot wrist 30 through the air supply pipe 44. The air supply pipe 44 is connected at one end to a fluid conveying pipe 62 within the robot housing 34 by means of a suitable pipe joint 60. The fluid conveying pipe 62 is formed as a hollow pipe having flanges 64 at both ends. The fluid conveying pipe 62 is connected to a coupling element 66, which is fitted on the shaft 54 of the first bevel gear 52, so that the innermost flange 64 of the fluid conveying pipe 62 is seated on the coupling element 66. An air conduit 54a is bored in the shaft 54 of the first bevel gear 52 substantially along the axis thereof and through the first rotary output shaft 36 to the outer end thereof. The inner end of the air conduit 54a communicates with an air conduit 54b bored in the shaft 54 perpendicularly to the axis of the shaft 54 at a position where the coupling element 66 is fitted on the shaft 54. A recessed annular groove 54c is formed in the circumference of the shaft 54 so that the groove 54c is able to fluidly communicate with the air conduit 54b. That is, the air conduit 54b has openings in the recessed annular groove 54c.

Figure 4:
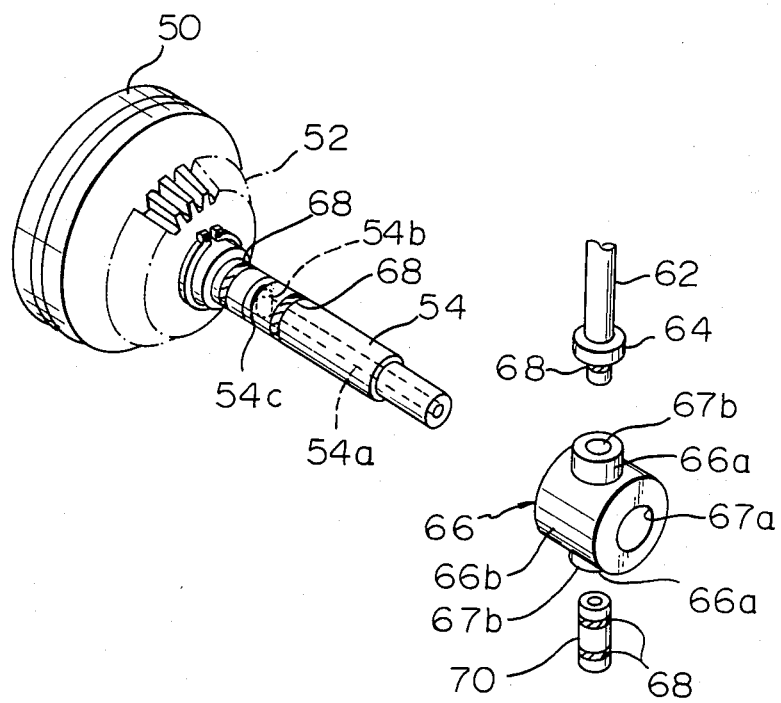
FIG. 4 is an exploded perspective view of the fluid conveying means provided in the robot wrist of the present invention.

Referring now to FIG. 4 illustrating more clearly the arrangement of the air conduits 54a and 54b and the annular groove 54c formed in the shaft 54 of the first bevel gear 52, seals 68, for example, O-rings, are arranged on opposite sides of the annular groove 54c. The coupling element 66 has a pair of upper and lower coupling seats 66a and a through-hole 67a of a diameter substantially the same as the diameter of the shaft 54 of the first bevel gear 52. The through-hole 67a is bored in the body 66b of the coupling element 66. The through-hole 67a is formed not only as an air inlet passageway communicating with center holes 67b formed in the paired upper and lower coupling seats 66a, but also as a bearing bore within which the shaft 54 of the first bevel gear 52 is rotatable. The flange 64 of the air conveying pipe 62 is fitted in the upper coupling seat 66a of the coupling element 66. A seal 68 attached to the air conveying pipe 62 at a position below the flange 64 prevents any leakage of air through the connected portion of the air conveying pipe 62 and the upper coupling seat 66a of the coupling element 66. A hollow junction pipe 70 is fitted in the lower coupling seat 66a of the coupling element 66 in a manner the same as that of fitting the air conveying pipe 62 in the upper coupling seat 66a.

The fitting portion of the hollow junction pipe 70 and the lower coupling seat 66a of the coupling element 66 is also sealed by an O-ring 68 fitted on the pipe 70, so that no leakage of air under pressure occurs. The junction pipe 70 is fitted in the central part of the second bevel gear 56 (FIG. 3) with the central bore of the junction pipe 70 communicating with an air conduit 72 (FIG. 3) formed in the second bevel gear 56. The above-mentioned junction between the junction pipe 70 and the second bevel gear 56 is also sealed by an O-ring 68 fitted on the pipe 70 so as to prevent any leakage of air through said junction.

Referring again to FIG. 3 the pressurized air conveyed into the coupling element 66 through the air conveying pipe 62 flows into the recessed annular groove 54c formed in the shaft 54 of the first bevel gear 52 via the coupling element 66. The pressurized air then flows into the air conduits 54a and 54b of the shaft 54 and is distributed toward the output end of the first rotary output shaft 36 as well as the output end of the second rotary output shaft 38.

From the foregoing, it will be understood that according to the present invention, the pressurized air to be supplied to the robot hand from the robot arm 120 is brought to the end faces 36a and 38a via the fluid conveying means built in the robot wrist 30. Therefore, the flexible conduits employed in conventional industrial robots for supplying the pressurized air directly from the robot arm to the robot hand can be eliminated.

In the robot wrist 30 of the embodiment of FIGS. 2 through 4, one of the output ends 36a and 38a of the first and the second rotary output shafts 36 and 38, which is not connected to the robot hand, should be plugged by a suitable plug capable of preventing leakage of the pressurized air. The plug may be, for example, a screw-threaded plug threadedly engaged with the output end 36a or 38a.

Figure 5:
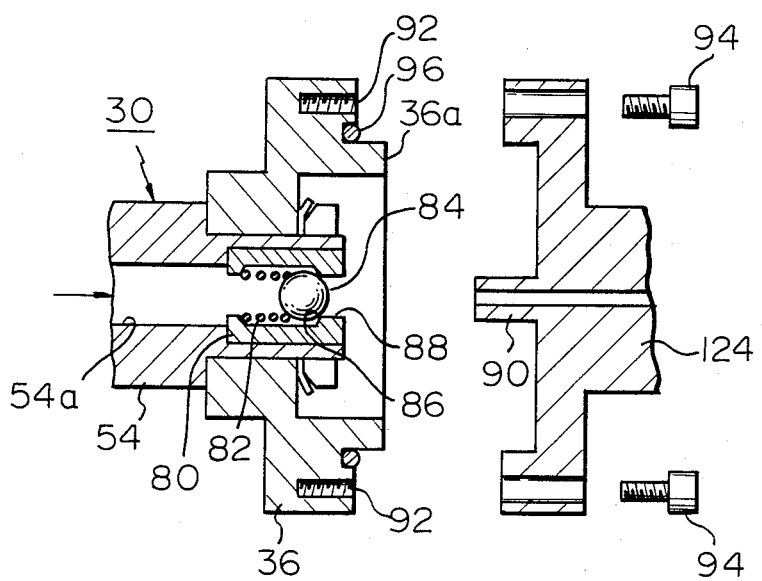
FIG. 5 is a partial cross-sectional view of the essential part of another embodiment of a robot wrist, according to the present invention.

FIG. 5 illustrates an essential part of a robot wrist of the second embodiment of the present invention. Identical elements are designated by identical reference numerals as those of FIGS. 2 through 4. It should be noted that in the second embodiment, stop valves are provided for the first and second rotary output shafts (for convenience sake, only a first rotary output shaft 36 is illustrated.) at the ends thereof instead of preventing the leakage of air by the employment of the plug elements mentioned in relation to the first embodiment. Those stop valves can be opened so as to supply the pressurized air to a robot hand when the robot hand is attached to the rotary output shaft. FIG. 5 illustrates the typical structure of one of those stop valves.

Referring to FIG. 5, a stop valve comprising a valve casing 80, a spring 82, and a ball valve 84 is provided at the junction between the shaft 54 of the first bevel gear and the first rotary output shaft 36. The ball valve 84 is resiliently pressed against a tapered valve seat 86 formed at the outer end of the valve casing 80 by means of the spring 82. As a result, an opening 88 is closed by the ball valve 84. A hollow projection 90 which hits in the opening 88 of the valve casing 80 is provided for the attaching part of the robot hand 124. Therefore, the hollow projection 90 enters into the valve casing 80 through the opening 88 and pushes the ball valve 84 back inward against the resilient force of the spring 82 when the robot hand 124 is pressed against the output end 36a in order to attach the robot hand 124 to the output end 36a of the robot wrist 30. This allows the pressurized air to flow through an open port between the valve seat 86 and the ball valve 84 and to be supplied to the robot hand 24 via the opening 88. The robot hand 124 can easily be attached to the robot wrist 30 by driving screws 94 into threaded holes 92 formed at the end of the first rotary output shaft 36 of the robot wrist 30. Reference numeral 96 designates an O-ring arranged for preventing any leakage of air under pressure when the robot hand 124 is attached to the robot wrist 30.

At this stage, it should be understood that the second rotary output shaft of the robot wrist 30 of the second embodiment has the same stop valve as that of the illustrated first rotary output shaft 36. Thus, the provision of stop valves which are opened as soon as the robot hand is attached to the corresponding output end of the robot wrist 30 allows automatic supply of the pressurized air from the robot wrist 30 to the robot hand through attachment of the robot hand to the robot wrist 30 and allows automatic stopping of the supply of the pressurized air through the removal of the robot hand from the robot wrist 30. The result is a very convenient air distributing means.

We claim:

1. A robot wrist attached to an end of a robot arm of an industrial robot for attaching thereto a manipulative robot hand, comprising:
    a wrist housing means for supporting therein first and second rotating output shafts, each shaft having an output end disposed in one of two substantially orthogonal end faces of said housing means, said output shafts also being substantially orthogonal to one another with the axes thereof intersecting at a point;
    a rotation drive means secured to said wrist housing means and directly driving said first rotating output shaft;
    a first bevel gear mounted on said first output shaft;
    a second bevel gear operatively engaged with said first bevel gear mounted on said second rotating output shaft, to drive said second rotating output shaft;
    fluid conduit means provided in each of said first and second output shafts for providing pressurized fluid to the output ends thereof for operating the manipulative robot hand;
    means for conveying the pressurized fluid from outside said wrist housing to said fluid conduit means; and
    coupling means for providing a tight connection between said conveying means and said fluid conduit means.

2. A robot wrist as set forth in claim 1, further comprising two stop valves, each being arranged in said output end of each said rotating output shaft, each said stop valve being openable when said robot hand is attached to each said output end.

3. A robot wrist as set forth in claim 2, wherein each said stop valve comprises a valve seat held in said output end of each said rotating output shaft, a ball valve, spring means pressing said ball valve against said valve seat and a seal means for preventing leakage of the pressurized fluid when a robot hand is attached.

4. A robot wrist as set forth in claim 1, wherein said fluid conduit means comprises fluid passageways formed in said two rotating output shafts, said fluid passageways extending toward each of said output ends of said two rotating output shafts from a common fluid input port formed in a part of one of said two rotating output shafts, said fluid input port being fluidly connected to said conveying means by means of said coupling means.

5. A robot wrist as set forth in claim 4, wherein said conveying means comprises a fluid conveying pipe held in said wrist housing means and wherein said coupling means comprises a coupling element having a bearing bore in which said one rotating output shaft having said fluid inlet port is rotatably fitted.

6. A robot wrist as set forth in claim 1, wherein said two rotating output shafts are commonly driven by said rotation drive means by means of a pair of bevel gear engaged with one another.

7. A robot wrist as set forth in claim 6, wherein said rotation drive means comprises an electric servomotor.

* * * * *